United States Patent
Onouchi et al.

(10) Patent No.: US 8,158,022 B2
(45) Date of Patent: Apr. 17, 2012

(54) POLARIZING FILM

(75) Inventors: Hisanari Onouchi, Osaka (JP); Sadahiro Nakanishi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 12/981,684

(22) Filed: Dec. 30, 2010

(65) Prior Publication Data

US 2011/0163268 A1    Jul. 7, 2011

(30) Foreign Application Priority Data

Jan. 5, 2010 (JP) ................. 2010-000654

(51) Int. Cl.
*C09K 19/00* (2006.01)
*C09K 19/52* (2006.01)
*C09B 39/00* (2006.01)
*G03C 1/00* (2006.01)

(52) U.S. Cl. .......... 252/299.01; 252/299.1; 428/1.3; 428/1.31; 534/763; 534/811; 430/270.1

(58) Field of Classification Search ............ 252/299.01, 252/299.1; 428/1.3, 1.31; 430/270.1; 534/763, 534/811

See application file for complete search history.

(56) References Cited

U.S. PATENT DOCUMENTS

| | | | |
|---|---|---|---|
| 6,277,966 B2 * | 8/2001 | Kayane et al. | 534/811 |
| 7,282,574 B1 * | 10/2007 | Cheng | 534/571 |
| 7,304,147 B2 * | 12/2007 | Sadamitsu et al. | 534/704 |
| 7,445,822 B2 * | 11/2008 | Sadamitsu | 428/1.31 |
| 7,514,129 B2 * | 4/2009 | Sadamitsu | 428/1.31 |
| 7,527,862 B2 * | 5/2009 | Yoneyama et al. | 428/411.1 |

FOREIGN PATENT DOCUMENTS

JP    2008-133421    6/2008

* cited by examiner

*Primary Examiner* — Geraldina Visconti

(74) *Attorney, Agent, or Firm* — Greenblum & Bernstein, PLC

(57) ABSTRACT

The present invention provides a polarizing film containing an azo compound represented by the following formula (1):

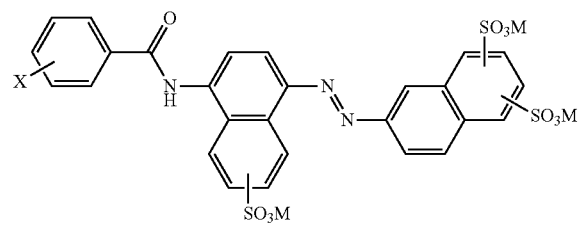

(1)

in which X is a hydrogen atom, a halogen atom, a nitro group, a cyano group, an alkyl group having 1 to 3 carbon atoms or an alkoxy group having 1 to 4 carbon atoms, and M is a counter ion.

5 Claims, No Drawings

POLARIZING FILM

FIELD OF THE INVENTION

The present invention relates to a polarizing film showing a high dichroic ratio on a short wavelength side of visible light.

BACKGROUND OF THE INVENTION

As described in JP-A-2008-133421, there has hitherto been known an azo compound (dichroic dye) showing absorption dichroism in a short wavelength region (380 to 500 nm) of visible light. Such an azo compound is used for the preparation of a neutral gray polarizing film (polarizing film having averaged transmittance and averaged polarization degree in a wide visible light region of 380 to 780 nm), for example, by mixing it with a dye showing absorption dichroism in a long wavelength region (more than 500 nm to 780 nm) of visible light.

However, although the azo compound described in the above-mentioned JP-A-2008-133421 shows a relatively high dichroic ratio on the short wavelength side (380 to 500 nm) of visible light, the dichroic ratio thereof is at most about 30, and 50 or less. Thus, the dichroic ratio thereof is still low under the present situation.

SUMMARY OF THE INVENTION

In order to solve the above-mentioned conventional problem, the present inventors have newly synthesized an azo compound having a benzene ring and two naphthalene rings in its molecular structure, in which one of the naphthalene rings is linked to the benzene ring by an amide bond, based on a presumption that an azo compound having a structure that includes an aromatic ring having high planarity and has a properly short molecular major axis is suitable. As a result, it has been found that a polarizing film having a high dichroic ratio in a short wavelength region of visible light is obtained.

Based on such a finding, the invention has been made in order to solve the above-mentioned conventional problem, and an object thereof is to provide a polarizing film having a high dichroic ratio in a short wavelength region of visible light.

Namely, the present invention provides the followings.

1. A polarizing film comprising an azo compound represented by the following formula (1):

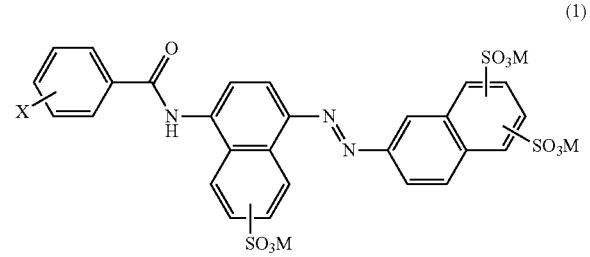

wherein X is a hydrogen atom, a halogen atom, a nitro group, a cyano group, an alkyl group having 1 to 3 carbon atoms or an alkoxy group having 1 to 4 carbon atoms, and M is a counter ion.

2. The polarizing film according to item 1, wherein the azo compound is contained in the polarizing film in an amount of 30 to 100% by weight based on the total weight of the polarizing film.

3. The polarizing film according to item 1 or 2, which has a thickness of 0.1 to 40 μm.

4. The polarizing film according to any one of items 1 to 3, which shows dichroism in a wavelength region of 380 to 500 nm in visible light.

5. The polarizing film according to any one of items 1 to 4, which has a dichroic ratio of 55 or more.

In an embodiment, the polarizing film contains an azo compound represented by the formula (1), and such a compound can form a molecular structure having high planarity by including a benzene ring and two naphthalene rings in its molecular structure and linking one of the naphthalene rings to the benzene ring by an amide bond. As a result, a π-π interaction between the molecules becomes strong, resulting in mutual stacking of the benzene rings and mutual stacking of the naphthalene rings, whereby a polarizing film having a high dichroic ratio can be obtained. Further, the conjugation length thereof becomes short as compared to a case where the respective aromatic rings (the benzene ring and the naphthalene rings are linked only by azo bonds), so that the polarizing film shows maximum absorption in a short wavelength region of visible light.

In a preferred embodiment, the amount of the azo compound contained in the polarizing film is 30 to 100% by weight based on the total weight of the polarizing film.

In another preferred embodiment, the polarizing film has a thickness of 0.1 to 40 μm.

In still another preferred embodiment, the polarizing film shows dichroism in a wavelength region of 380 to 500 nm in visible light.

In still further another preferred embodiment, the polarizing film has a dichroic ratio of 55 or more.

DETAILED DESCRIPTION OF THE INVENTION

The polarizing film according to the invention will be described below based on an embodiment in which the invention is embodied.

(1) Polarizing Film

The polarizing film according to this embodiment contains a specific azo compound described later. The azo compound is contained in the polarizing film preferably in an amount of 30 to 100% by weight, based on the total weight of the polarizing film.

Further, the polarizing film preferably has a thickness of 0.1 to 40 μm.

Furthermore, the polarizing film preferably shows absorption dichroism in a short wavelength region (380 to 500 nm) of visible light. Such a characteristic is obtained by orientation of the azo compound in the polarizing film. The polarizing film preferably has a dichroic ratio of 55 or more.

(2) Azo Compound

The azo compound used in the polarizing film according to this embodiment is a compound represented by the following formula (1), and more preferably a compound represented by the following formula (2):

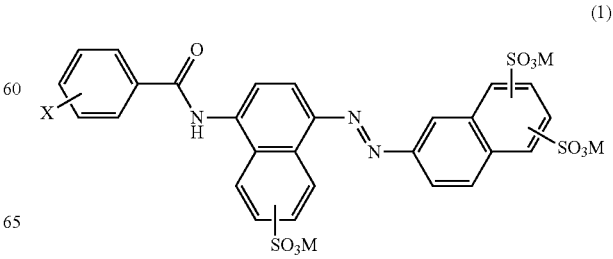

-continued

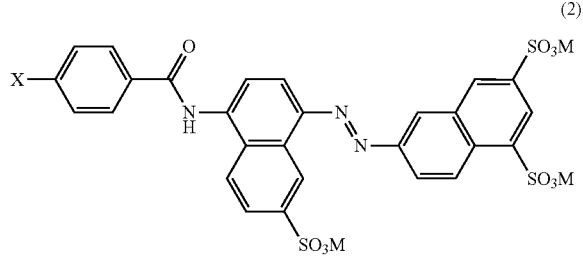

(2)

In the above-mentioned formulas (1) and (2), X is a hydrogen atom, a halogen atom, a nitro group, a cyano group, an alkyl group having 1 to 3 carbon atoms or an alkoxy group having 1 to 4 carbon atoms, and preferably a cyano group. M is a counter ion, preferably an alkali metal ion, and especially preferably selected from $Li^+$, $Na^+$ and $K^+$.

The above-mentioned azo compound has a property of causing an isotropic phase-liquid crystal phase transition (lyotropic liquid crystallinity) when the azo compound is dissolved in a solvent to form a solution and the temperature or the concentration of the solution is changed, and is highly oriented by orientation regulating force such as shear stress. Accordingly, a polarizing film showing a high dichroic ratio can be obtained.

Synthesis methods of the above-mentioned azo compound include, for example, a method of converting a 6-amino naphthalenedisulfonic acid derivative to a diazonium salt by using sodium nitrite and hydrochloric acid, allowing the resulting diazonium salt to conduct a coupling reaction with 2-amino naphthalenesulfonic acid in an acidic cool-temperature aqueous solution to obtain a monoazo compound, and then, reacting the resulting monoazo compound with an acid chloride in the presence of pyridine in a nonpolar solvent such as N-methylpyrrolidone.

(3) Production Method of Polarizing Film

There is no particular limitation on a production method of the polarizing film according to this embodiment. For example, the polarizing film having a thickness of less than 10 μm can be obtained by dissolving the above-mentioned azo compound in a solvent and applying the resulting solution onto an orientation substrate in a thin film form.

The solvent is one which can dissolve the azo compound, and preferably a hydrophilic solvent. Preferable examples of the hydrophilic solvent include water, alcohols, cellosolves or mixed solvents thereof.

Examples of the above-mentioned orientation substrate include a drawn film or a rubbing-treated polymer film. After formation of the polarizing film on a surface of the orientation substrate, the polarizing film may be removed by peeling or used as it is. In the above-mentioned application method, there can be used, for example, a bar coater, a slot die coater or the like.

On the other hand, the polarizing film having a thickness exceeding 10 μm can be obtained, for example, by immersing a polyvinyl alcohol film in an aqueous solution containing the above-mentioned azo compound, followed by drawing the same. The aqueous solution preferably contains the above-mentioned azo compound in an amount of 0.5 to 30% by weight, based on the total weight of the aqueous solution.

The thickness of the above-mentioned polyvinyl alcohol film before drawing is preferably from 15 to 100 μm. The total draw ratio of the polyvinyl alcohol film is, for example, from twice to 6 times the original length thereof.

(4) Applications

The polarizing film produced as described above is suitably used in various panels attached, for example, to computers, cellular phones, television sets and the like.

EXAMPLES

6-Amino-1,3-naphthalenedisulfonic acid was converted to a diazonium salt by using sodium nitrite and hydrochloric acid, and a coupling reaction of the diazonium salt with 5-amino-2-naphthalenesulfonic acid was conducted in an acidic cool-temperature aqueous solution to obtain a monoazo compound. Then, a coupling reaction of this monoazo compound with 4-cyanobenzoyl chloride was conducted in N-methylpyrrolidone to convert the sulfonic acid salt to a lithium salt, thereby obtaining an azo compound represented by the following formula (3) (a lyotropic liquid crystal showing a nematic liquid crystal phase in an aqueous solution).

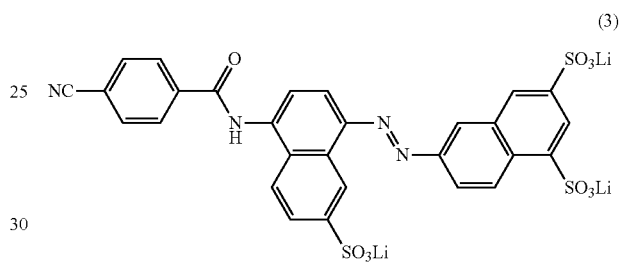

(3)

The above-mentioned azo compound was dissolved in ion-exchanged water, and the concentration thereof was adjusted to 5% by weight to prepare a coating solution. This coating solution was applied onto a rubbing-treated and corona-treated cycloolefin polymer film (manufactured by Zeon Corporation, trade name: "ZEONOR", thickness: 50 μm) by using a bar coater, followed by air drying to obtain a polarizing film having a thickness of 0.4 μm. This polarizing film had a maximum absorption wavelength of 405 nm and a dichroic ratio of 59.

Measuring Methods (1) Measurement of Maximum Absorption Wavelength

Measurement was made by using an ultraviolet-visible spectrophotometer (manufactured by JASCO Corporation, trade name: "V-7100").

(2) Measurement of Dichroic Ratio

A Glan-Thompson polarizer was disposed at an output position of measurement light of the spectrophotometer (manufactured by JASCO Corporation, trade name: "V-7100"), and linearly-polarized measurement light was allowed to enter a sample. Then, $k_1$ and $k_2$ were determined, and the dichroic ratio was calculated from the following equation:

Dichroic ratio=$\log(1/k_2)/\log(1/k_1)$.

Herein, $k_1$ represents the transmittance of linearly-polarized light in a maximum transmittance direction, and $k_2$ represents the transmittance of linearly-polarized light in a direction perpendicular to the maximum transmittance direction.

While the present invention has been described in detail and with reference to specific embodiments thereof, it will be apparent to one skilled in the art that various changes and modifications can be made therein without departing from the scope thereof.

This application is based on Japanese patent application No. 2010-000654 filed Jan. 5, 2010, the entire contents thereof being hereby incorporated by reference.

What is claimed is:

1. A polarizing film comprising an azo compound represented by the following formula (1):

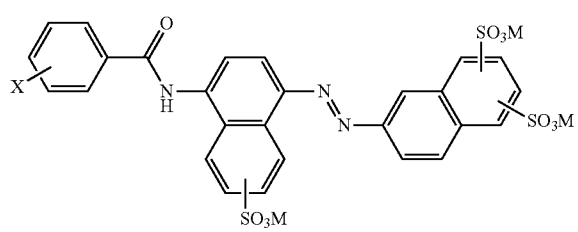

(1)

wherein X is a hydrogen atom, a halogen atom, a nitro group, a cyano group, an alkyl group having 1 to 3 carbon atoms or an alkoxy group having 1 to 4 carbon atoms, and M is a counter ion.

2. The polarizing film according to claim 1, wherein the azo compound is contained in the polarizing film in an amount of 30 to 100% by weight based on the total weight of the polarizing film.

3. The polarizing film according to claim 1, which has a thickness of 0.1 to 40 μm.

4. The polarizing film according to claim 1, which shows dichroism in a wavelength region of 380 to 500 nm in visible light.

5. The polarizing film according to claim 1, which has a dichroic ratio of 55 or more.

* * * * *